(12) United States Patent
Yana Motta et al.

(10) Patent No.: US 9,809,734 B2
(45) Date of Patent: Nov. 7, 2017

(54) HEAT TRANSFER COMPOSITIONS AND METHODS

(71) Applicant: HONEYWELL INTERNATIONAL INC., Morristown, NJ (US)

(72) Inventors: Samuel F. Yana Motta, East Amherst, NY (US); Mark W. Spatz, East Amherst, NY (US); Ronald P. Vogl, Springville, NY (US); Elizabet del Carmen Vera Becerra, Williamsville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/609,514

(22) Filed: Jan. 30, 2015

(65) Prior Publication Data
US 2015/0135765 A1    May 21, 2015

Related U.S. Application Data

(60) Division of application No. 13/762,550, filed on Feb. 8, 2013, now Pat. No. 8,980,118, and a continuation-in-part of application No. 13/099,218, filed on May 2, 2011, now abandoned.

(60) Provisional application No. 61/598,056, filed on Feb. 13, 2012.

(51) Int. Cl.
*C09K 5/04* (2006.01)
*F25B 45/00* (2006.01)
*F25B 1/00* (2006.01)

(52) U.S. Cl.
CPC ............... *C09K 5/045* (2013.01); *F25B 1/00* (2013.01); *F25B 45/00* (2013.01); *C09K 2205/126* (2013.01); *C09K 2205/22* (2013.01)

(58) Field of Classification Search
CPC .............. C09K 5/045; C09K 2205/126; C09K 2205/22
See application file for complete search history.

(56) References Cited

U.S. PATENT DOCUMENTS

| | | | |
|---|---|---|---|
| 8,980,118 B2 * | 3/2015 | Yana Motta | C09K 5/045 252/67 |
| 2010/0122545 A1 * | 5/2010 | Minor | C08J 9/146 62/324.1 |

* cited by examiner

*Primary Examiner* — John Hardee
(74) *Attorney, Agent, or Firm* — Colleen D. Szuch

(57) ABSTRACT

Compositions, methods and systems which comprise or utilize a multi-component mixture comprising: (a) HFC-32; (b) HFC-125; (c) HFO-1234yf and/or HFO-1234ze; (d) HFC-134a. In certain non-limiting aspects, such refrigerants may be used as a replacement for R-404A.

22 Claims, No Drawings

HEAT TRANSFER COMPOSITIONS AND METHODS

CROSS REFERENCES TO RELATED APPLICATIONS

The present application claims the priority benefit as a divisional application of U.S. application Ser. No. 13/762,550, filed on Feb. 8, 2013, now U.S. Pat. No. 8,980,118.

The present application claims the priority benefit of U.S. Provisional Application No. 61/598,056, filed on Feb. 13, 2012, the contents of which are incorporated herein by reference.

The present application is also related to as a continuation-in-part of and claims the priority benefit of U.S. application Ser. No. 13/099,218, filed May 2, 2011 (now abandoned), which is a continuation-in-part of International Application No. PCT/US2010/034120, filed May 7, 2010, which in turn claims the benefit of U.S. Provisional Application Ser. Nos. 61/176,773, filed May 8, 2009 (expired); 61/240,786, filed Sep. 9, 2009 (expired), 61/247,816, filed Oct. 1, 2009 (expired), 61/329,955, filed Apr. 30, 2010 (expired). International Application No. PCT/US2010/034120 is also a continuation of U.S. application Ser. No. 12/511,954, filed Jul. 29, 2009 (currently pending). Each of the above-identified applications is incorporated in its entirety herein by reference.

The present application is related to as a continuation-in-part of and claims the priority benefit of U.S. application Ser. No. 13/182,591, filed Jul. 14, 2011 (currently pending), which in turn claims the priority benefit of U.S. Provisional Application No. 61/364,373, filed on Jul. 14, 2010 (expired), the contents of which are incorporated herein by reference.

FIELD OF THE INVENTION

This invention relates to compositions, methods and systems having utility in refrigeration applications, with particular benefit in medium and low temperature refrigeration applications, and in particular aspects to refrigerant compositions for replacement of refrigerant HFC-404A for heating and cooling applications and to retrofitting medium and low temperature refrigerant systems, including systems designed for use with HFC-404A.

BACKGROUND

Mechanical refrigeration systems, and related heat transfer devices such as heat pumps and air conditioners, using refrigerant liquids are well known in the art for industrial, commercial and domestic uses. Fluorocarbon based fluids have found widespread use in many residential, commercial and industrial applications, including as the working fluid in systems such as air conditioning, heat pump and refrigeration systems. Because of certain suspected environmental problems, including the relatively high global warming potentials associated with the use of some of the compositions that have heretofore been used in these applications, it has become increasingly desirable to use fluids having low or even zero ozone depletion and global warming potentials, such as hydrofluorocarbons ("HFCs"). For example, a number of governments have signed the Kyoto Protocol to protect the global environment and setting forth a reduction of CO2 emissions (global warming). Thus, there is a need for a low- or non-flammable, non-toxic alternative to replace certain of high global warming HFCs.

One important type of refrigeration system is known as a "low temperature refrigeration system." Such systems are particularly important to the food manufacture, distribution and retail industries in that they play a vital role in ensuring that food which reaches the consumer is both fresh and fit to eat. In such low temperature refrigeration systems, a commonly used refrigerant liquid has been HFC-404A (the combination of HFC-125:HFC-143a:HFC134a in an approximate 44:52:4 weight ratio is referred to in the art as HFC-404A or R-404A). R-404A has an estimated high Global Warming Potential (GWP) of 3922.

There has thus been an increasing need for new fluorocarbon and hydrofluorocarbon compounds and compositions that are attractive alternatives to the compositions heretofore used in these and other applications. For example, it has become desirable to retrofit chlorine-containing refrigeration systems by replacing chlorine-containing refrigerants with non-chlorine-containing refrigerant compounds that will not deplete the ozone layer, such as hydrofluorocarbons (HFC's). Industry in general and the heat transfer industry in particular are continually seeking new fluorocarbon based mixtures that offer alternatives to, and are considered environmentally safer substitutes for, CFCs and HCFCs. It is generally considered important, however, at least with respect to heat transfer fluids, that any potential substitute must also possess those properties present in many of the most widely used fluids, such as excellent heat transfer properties, chemical stability, low- or no-toxicity, non-flammability and/or lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirable for CFC refrigerant substitutes to be effective without major engineering changes to conventional vapor compression technology currently used with CFC refrigerants.

Flammability is another important property for many applications. That is, it is considered either important or essential in many applications, including particularly in heat transfer applications, to use compositions which are non-flammable. Thus, it is frequently beneficial to use in such compositions compounds which are nonflammable. As used herein, the term "nonflammable" refers to compounds or compositions which are determined to be nonflammable as determined in accordance with ASTM standard E-681, dated 2002, which is incorporated herein by reference. Unfortunately, many HFC's which might otherwise be desirable for used in refrigerant compositions are not nonflammable as that term is used herein. For example, the fluoroalkane difluoroethane (HFC-152a) and the fluoroalkene 1,1,1-trifluorpropene (HFO-1243zf) are each flammable and therefore not viable for use in many applications.

Applicants have thus come to appreciate a need for compositions, and particularly heat transfer compositions, that are highly advantageous in heating and cooling systems and methods, particularly vapor compression heating and cooling systems, and even more particularly low temperature refrigerant systems, including systems which are used with and/or have been designed for use with HFC-404A.

SUMMARY

Applicants have found that the above-noted needs, and other needs, can be satisfied by compositions, methods and systems which comprise or utilize a multi-component mixture, that in certain embodiments, comprises: (a) from about 10% to about 35% by weight of HFC-32; (b) from about 10% to about 35% by weight of HFC-125; (c) from greater than 0% to about 30% by weight of HFO-1234ze; (d) from about 10% to about 35% by weight of HFC-134a, (e) optionally but preferably from greater than about 0% to about 30% by weight of HFO-1234yf, and optionally (f) up to about 10% by weight of $CF_3I$ and/or up to about 5% by weight of HFCO-1233ze, from about 0% to about 30% by weight of HFO-1234yf and with the weight percent being based on the total of the components (a)-(f) in the composition.

In certain preferred embodiments, HFC-32 is provided in an amount from about 15% to about 30% by weight, and in further preferred embodiments is provided in an amount from about 20% to about 30% by weight, with the weight percent being based on the total of the components (a)-(f) in the composition.

In certain preferred embodiments, HFC-125 is provided in an amount from about 10% to about 30% by weight, and in further preferred embodiments is provided in an amount from about 20% to about 30% by weight, with the weight percent being based on the total of the components (a)-(f) in the composition.

In certain preferred embodiments, HFO-1234yf is provided in an amount from about or greater than 0% to about 25% or from about or greater than 0% to about 22% by weight of HFO-1234yf, with the weight percent being based on the total of the components (a)-(f) in the composition. In the same or alternative embodiments, HFO-1234ze is provided in an amount from about 1% to about 30% by weight of HFO-1234ze or from about 5% to about 30% by weight of HFO-1234ze, with the weight percent being based on the total of the components (a)-(f) in the composition.

In certain preferred embodiments, HFC-134a is provided in an amount from about 15% to about 35% by weight, and in further preferred embodiments is provided in an amount from about 15% to about 30% by weight, with the weight percent being based on the total of the components (a)-(f) in the composition.

In further embodiments, the composition has a weight ratio of HFC-32:HFC-125 of from about 0.9:1.2 to about 1.2:0.9. In further, or alternative, embodiments the composition has a weight ratio of HFO-1234ze:HFO-1234yf of about 5:1 to about 0.1:1 or a weight ratio of HFO-1234ze:HFO-1234yf of between about 3:1 to about 0.2:1. In even further, or alternative, embodiments, the composition has a weight ratio of 134a to a combination of HFO-1234ze and HFO-1234yf between about 5:7 to about 1:1 or of about 4:6.

The present invention provides also methods and systems which utilize the compositions of the present invention, including methods and systems for heat transfer and for retrofitting existing heat transfer systems. Certain preferred method aspects of the present invention relate to methods of providing relatively low temperature cooling, such as in low temperature refrigeration systems. Other preferred method aspects of the present invention provide methods of retrofitting an existing refrigeration system, preferably low temperature refrigeration systems, designed to contain and/or containing R-404A refrigerant comprising introducing a composition of the present invention into the system without substantial engineering modification of said existing refrigeration system.

The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these.

DETAILED DESCRIPTION OF THE INVENTION

Low temperature refrigeration systems are important in many applications, such as to the food manufacture, distribution and retail industries. Such systems play a vital role in ensuring that food which reaches the consumer is both fresh and fit to eat. In such low temperature refrigeration systems, one of the refrigerant liquids which has been commonly used has been HFC-404A, which has an estimated high Global Warming Potential (GWP) of 3922. Applicants have found that the compositions of the present invention satisfy in an exceptional and unexpected way the need for alternatives and/or replacements for refrigerants in such applications, particularly and preferably HFC-404A, that at once have lower GWP values and provide substantially non-flammable, non-toxic fluids that have a close match in cooling capacity and/or efficiency to HFC-404A in such systems.

The present invention may also encompass medium temperature refrigeration composition, systems and methods. According to certain preferred embodiments, the present methods and systems involve evaporator temperatures of from above about −15° C. to about 5° C. An example of such a medium temperature system and method involves providing cooling in the fresh food compartment of a residential refrigerator.

Heat Transfer Compositions

The compositions of the present invention are generally adaptable for use in heat transfer applications, that is, as a heating and/or cooling medium, but are particularly well adapted for use, as mentioned above, in medium and low temperature refrigeration systems, and preferably in low temperature systems, that have heretofor used HFC-404A and/or systems that have heretofor used R-22.

Applicants have found that use of the components of the present invention within the broad and narrowed ranges described herein is important to achieve the advantageous but difficult to achieve combinations of properties exhibited by the present compositions, particularly in the preferred systems and methods, and that use of these same components but substantially outside of the identified ranges can have a deleterious effect on one or more of the important properties of the compositions, systems or methods of the invention.

In certain preferred embodiments, compositions of the present invention comprise, consist essentially of, or consist of: (a) difluoromethane (HFC-32); (b) pentafluoroethane (HFC-125); (c) HFO-1234ze, HFO-1234yf or combinations thereof; (d) 1,1,1,2-tetrafluoroethane (HFC-134a); and optionally (e) $CF_3I$ and/or 1233ze.

HFC-32 may be provided in an amount of from greater than 0 wt. % to about 50 wt. % by weight of the compositions, in certain preferred aspects in an amount of from about 10 wt. % to about 40 wt. % by weight of the compositions, in further preferred aspects in an amount of from about 10 wt. % to about 35 wt. % by weight of the compositions, in even further preferred aspects in an amount of from about 15 wt. % to about 30 wt. % by weight of the compositions, and in even further preferred aspects in an amount of from about 20 wt. % to about 30 wt. % by weight of the compositions, each based on the total weight of the components (a)-(e).

HFC-125 may be provided in an amount of from greater than 0 wt. % to about 50 wt. % by weight of the compositions, in certain preferred aspects in an amount of from about 10 wt. % to about 40 wt. % by weight of the compositions, in further preferred aspects in an amount of from about 10 wt. % to about 35 wt. % by weight of the compositions, in even further preferred aspects in an amount of from about 10 wt. % to about 30 wt. % by weight of the compositions, and in even further preferred aspects in an amount of from about 20 wt. % to about 30 wt. % by weight of the compositions, each based on the total weight of the components (a)-(e).

HFO-1234ze may be provided in an amount of from greater than 0 wt. % to about 30 wt. % by weight of the compositions, in certain preferred aspects in an amount of from about 1 wt. % to about 30 wt. % by weight of the compositions, and in further preferred aspects in an amount of from about 5 wt. % to about 30 wt. % by weight of the compositions, each based on the total weight of the components (a)-(e).

HFO-1234yf, when present in such compositions, may be provided in an amount of from about or greater than 0 wt. % to about 30 wt. % by weight of the compositions, in certain preferred aspects in an amount of from about or greater than 0 wt. % to about 25 wt. % by weight of the compositions, and in further preferred aspects in an amount of from about or greater than 0 wt. % to about 30 wt. % by weight of the compositions, each based on the total weight of the components (a)-(e).

HFC-134a may be provided in an amount of from greater than 0 wt. % to about 50 wt. % by weight of the compositions, in certain preferred aspects in an amount of from about 5 wt. % to about 40 wt. % by weight of the compositions, in further preferred aspects in an amount of from about 10 wt. % to about 35 wt. % by weight of the compositions, in even further preferred aspects in an amount of from about 15 wt. % to about 35 wt. % by weight of the compositions, and in even further preferred aspects in an amount of from about 15 wt. % to about 30 wt. % by weight of the compositions, each based on the total weight of the components (a)-(e).

Highly preferred combinations of properties are achieved for compositions having a weight ratio of HFC-32:HFC-125 of from about 0.9:1.2 to about 1.2:0.9, with a ratio of about 1:1 being preferred in certain embodiments. Applicants have found that highly preferred combinations of properties are also achieved for compositions having a weight ratio of HFO-1234ze:HFO-1234yf of from about 5:1 to about 0.1:1 or between about 0.2:1 to 3:1.

For the purposes of convenience, the combination HFO-1234ze and HFO-1234yf is referred to herein as the "tetrafluoropropene component" or "TFC," and in certain embodiments highly preferred combinations of properties can be achieved for composition which comprise a weight ratio of HFC-134a:TFC of from about 5:7 to about 1:1, with a ratio of about 4:6 being preferred in certain embodiments.

Although it is contemplated that either isomer of HFO-1234ze may be used, applicants have found that it is preferred, in certain embodiments, that the HFO-1234ze comprise transHFO-1234ze, and preferably comprise transHFO-1234ze in major proportion, and in certain embodiments consist essentially of transHFO-1234ze.

As mentioned above, applicants have found that the compositions of the present invention are capable of achieving a difficult to achieve combination of properties, including particularly low GWP. By way of non-limiting example, the following Table A illustrates the substantial improvement in GWP exhibited by certain compositions of the present invention in comparison to the GWP of HFC-404A, which has a GWP of 3922.

TABLE A

| Composition of the Invention (weight fraction, based on identified components) | Name | GWP | GWP as a Percentageof R404A GWP |
|---|---|---|---|
| R125/R134a/R143a (0.44/0.04/0.52) | R404A | 3922 | |
| R32/R125/R134a/1234ze/1234yf (0.25/0.25/0.21/0.20/0.09) | A1 | 1344 | 34% |
| R32/R125/R134a/1234yf (0.25/0.25/0.2/0.3) | A2 | 1330 | 34% |
| R32/R125/R134a/1234ze/1234yf (0.26/0.26/0.21/0.17/0.1) | A3 | 1386 | 35% |
| R32/R125/R134a/1234ze (0.26/0.26/0.21/0.27) | A4 | 1386 | 35% |
| R32/R125/R134a/1234ze/1234yf (0.26/0.26/0.21/0.07/0.20) | A5 | 1386 | 35% |

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition, and in some case potentially in amount greater than about 50 percent and other cases in amounts as low as about 5 percent. Furthermore, the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), PAG oils, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

Other additives not mentioned herein can also be included by those skilled in the art in view of the teachings contained herein without departing from the novel and basic features of the present invention.

Heat Transfer Methods and Systems

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. In certain preferred embodiments, the compositions of the present invention are used in refrigeration systems originally designed for use with an HFC refrigerant, such as, for example, R-404. The preferred compositions of the present invention tend to exhibit many of the desirable characteristics of R-404A but have a GWP that is substantially lower than that of R-404A while at the same time having a capacity and/or efficiency that is substantially similar to or substantially matches, and preferably is as high as or higher than R-404A. In particular, applicants have recognized that certain preferred embodiments of the present compositions tend to exhibit relatively low global warming potentials ("GWPs"), preferably less than about 2500, more preferably less than about 2400, and even more preferably not greater than about 2300. In certain embodiments, the present compositions have a GWP of about 1500 or less, and even more preferable of less than about 1000.

In certain other preferred embodiments, the present compositions are used in refrigeration systems which had contained and/or had originally been designed for use with R-404A. Preferred refrigeration compositions of the present invention may be used in refrigeration systems containing a lubricant used conventionally with R-404A, such as mineral oils, polyalkylbenzene, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers (including chillers using centrifugal compressors), and the like.

As mentioned above, the present invention achieves exceptional advantage in connection with systems known as low temperature refrigeration systems. As used herein the term "low temperature refrigeration system" refers to vapor compression refrigeration systems which utilize one or more compressors and a condenser temperature of from about 35° C. to about 45° C. In preferred embodiments of such systems, the systems have an evaporator temperature of from about −40° C. and less than about −15° C., more preferably from about −35° C. to about −25° C., with an evaporator temperature preferably of about −32° C. Moreover, in preferred embodiments of such systems, the systems have a degree of superheat at evaporator outlet of from about 0° C. to about 10° C., with a degree of superheat at evaporator outlet preferably of from about 4° C. to about 6° C. Furthermore, in preferred embodiments of such systems, the systems have a degree of superheat in the suction line of from about 15° C. to about 25° C., with a degree of superheat in the suction line preferably of from about 20° C. to about 25° C.

In one non-limiting embodiment, the heat transfer compositions of the present invention may be used to retrofit an existing refrigeration system with or without having to substantially modify the system and with or without having to drain completely the existing refrigerant. In one aspect, part of the refrigerant charge is drained from the system, which may include more than 5%, 10%, 25%, 50%, 75% or the like. The removed refrigerant charge is then replaced with one or a combination of the non-flammable, low GWP refrigerants discussed herein.

In alternative embodiments, rather than partially draining the existing system, the refrigerants of the present invention may be used to "top off" existing systems after a partial refrigerant leak. Many commercial systems, for example, have relatively high refrigerant leak rates which require routine addition of refrigerant over the life of the system. In one method of the present invention, a refrigerant system is provided with less than the full or designed charge of refrigerant in the system, which, in preferred embodiments, occurs as a result of leakage of refrigerant from the system, and a refrigerant composition of the present invention is used to recharge the system, preferably during normal recharge maintenance. If the system leaked R404A, for example, it would be recharged with one or a combination of the blends identified herein. The present methods permit such to occur while substantially maintaining capacity of the system, maintaining or improving energy efficiency (lower electricity consumption which equates to lower operating cost for the users), and lowering the GWP of the refrigerant contained in the system (lowering environmental impact). In preferred embodiments, such a method can be performed regardless of how much refrigerant has leaked, preferably without a blend calculation, and provides a simple (and low cost) way to reduce environmental impact associated with recharging of an existent system without deviating from the routine maintenance schedule of the system.

In accordance with the foregoing, applicants' have recognized that even relatively large amounts of R404A when used in combination with the blends of the present invention, whether in the form of an unintentional contaminant, as an intentionally added ingredient or as the remaining refrigerant after a system replacement or recharge, do not have a substantially deleterious effect on the performance of the refrigerants and/or refrigeration systems of the present invention. Conversely, applicants have also come to recognize that relatively large amounts of the blends of the present invention in R404A, whether in the form of an unintentional contaminant or as an intentionally added ingredient, do not have a substantially deleterious effect on the performance of the refrigerant. Accordingly, whereas in other cases the presence of such a contaminant might otherwise disqualify the use of the refrigerant with the contaminant, applicants have come to recognize that the use of such mixtures of refrigerants will generally be acceptable for the intended purpose. Accordingly, one advantage of the methods and compositions of the present invention is that, from a workability standpoint, there is generally not a great incentive to ensure that R404A is entirely absent from the low GWP refrigerants, and vice versa, and under such circumstances there is an increased possibility that, in the absence of the methods provided by the present invention, substantial and severe problems would arise with the operation of many existing automatic purge systems. However, the present methods overcome these problems and add reliability, safety and efficiency to the systems.

EXAMPLES

The following examples are provided for the purpose of illustrating the present invention but without limiting the scope thereof.

Example 1

Performance Parameters—Low Temperature System

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system is provided. In the case of such a system illustrated in this Example, the condenser temperature is set to 40.55° C., which generally corresponds to an outdoor temperature of about 35° C. The degree of subcooling at the expansion device inlet is set to 5.55° C. The evaporating temperature is set to −31.6° C., which corresponds to a box temperature of about −26° C. The degree of superheat at evaporator outlet is set to 5.55° C. The degree of superheat in the suction line is set to 13.88° C., and the compressor efficiency is set to 65%. The pressure drop and heat transfer in the connecting lines (suction and liquid lines) are considered negligible, and heat leakage through the compressor shell is ignored. Several operating parameters are determined for the compositions A1-A5 identified in Table A above in accordance with the present invention, and these operating parameters are reported in Table 1 below, based upon HFC-404A having a COP value of 100%, a capacity value of 100% and a discharge temperature of 97.6° C.

TABLE 1

| Name | GWP | Evaporator Glide (° C.) | Capacity (%) | COP (%) |
|---|---|---|---|---|
| R404A | 3922 | 0.5 | 100% | 100% |
| A1 | 1344 | 4.9 | 96% | 110% |
| A2 | 1330 | 3.5 | 103% | 108% |
| A3 | 1386 | 4.7 | 99% | 109% |
| A4 | 1386 | 5.4 | 95% | 110% |
| A5 | 1386 | 3.9 | 102% | 109% |

As can be seen from the Table 1 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions A1-A5 exhibit capacities in this low temperature refrigeration system that are within about 8%, and even more preferably within about 5% of that of R404A. All these blends efficiencies (COP) higher that R404A by as much as 10% which is very desirable. Especially in view of the improved GWP of compositions A1-A5, these compositions of the present invention are excellent candidates for use as drop-in replacements for low temperature refrigeration systems originally containing and/or designed to contain R-404A.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 2

Retrofit Parameters—Low Temperature System

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

Discharge Temperature that is preferably lower than about 130° C., and even more preferably lower than about 125° C. The advantage of such a characteristic is that it permits the use of existing equipment without activation of the thermal protection aspects of the system, which are preferably designed to protect compressor components. This parameter is advantageous in that it avoids the use of costly controls such as liquid injection to reduce discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

The above-noted and other operating parameters are determined for the compositions A1-A5 identified in Table A above in accordance with the present invention, and these operating parameters is reported in Table 2 below:

TABLE 2

| Name | Discharge Pressure (%) | Discharge Temp. (° C.) | Suction Pressure (%) | Normal Boiling Temp. (° C.) |
|---|---|---|---|---|
| R404A | 100% | 91.9 | 100% | −46.2 |
| A1 | 96% | 117.7 | 78% | −44.9 |
| A2 | 103% | 113.4 | 87% | −46.1 |
| A3 | 99% | 118.3 | 80% | −45.3 |
| A4 | 95% | 120.4 | 76% | −44.8 |
| A5 | 97% | 116 | 85% | −45.9 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions A1-A5, which in general can be used in most retrofit procedures without any change of major components. In all compositions A1-A5, the discharge pressure and temperature is below the limit and the Normal Boiling Temperature is similar to R404A therefore they can be used in most existent refrigeration systems.

Example 3

Performance Parameters

A medium temperature refrigeration system is provided. In the case of such a system illustrated in this Example, the condenser temperature is set to 40.55° C., which generally corresponds to an outdoor temperature of about 35° C. The degree of subcooling at the expansion device inlet is set to 5.55° C. The evaporating temperature is set to −3.88° C., which corresponds to a box temperature of about 1.66° C. The degree of superheat at evaporator outlet is set to 5.55° C. The degree of superheat in the suction line is set to 13.88° C., and the compressor efficiency is set to 65%. The pressure drop and heat transfer in the connecting lines (suction and liquid lines) are considered negligible, and heat leakage through the compressor shell is ignored. Several operating parameters are determined for the compositions A1-A5 identified in Table A above in accordance with the present invention, and these operating parameters are reported in Table 3 below, based upon HFC-404A having a COP value of 100%, a capacity value of 100% and a discharge temperature of 76° C.

TABLE 3

| Name | GWP | Evaporator Glide (° C.) | Capacity (%) | COP (%) |
|---|---|---|---|---|
| R404A | 3922 | 0.5 | 100% | 100% |
| A1 | 1344 | 5.4 | 99% | 106% |
| A2 | 1330 | 3.9 | 104% | 105% |
| A3 | 1386 | 5.1 | 101% | 106% |
| A4 | 1386 | 5.9 | 98% | 107% |
| A5 | 1386 | 4.4 | 103% | 105% |

As can be seen from the Table 3 above, applicants have found that the compositions of the present invention are capable of at once achieving many of the important refrigeration system performance parameters close to the parameters for R-404A, and in particular sufficiently close to permit such compositions to be used as a drop-in replacement for R-404A in medium temperature refrigeration systems and/or for use in such existing systems with only minor system modification. For example, compositions A1-A5 exhibit capacities in this medium temperature refrigeration system that are within about 8%, and even more preferably within about 5% of that of R404A. All these blends efficiencies (COP) are higher that R404A by as much as 7% which is very desirable. Especially in view of the improved GWP of compositions A1-A5, these compositions of the present invention are excellent candidates for use as drop-in replacements for medium temperature refrigeration systems originally containing and/or designed to contain R-404A.

Since many existing medium temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, medium temperature refrigeration systems.

Example 4

Retrofit Parameters

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of medium temperature refrigeration systems, including particularly medium temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

Discharge Temperature that is preferably lower than about 130° C., and even more preferably lower than about 125° C. The advantage of such a characteristic is that it permits the use of existing equipment without activation of the thermal protection aspects of the system, which are preferably designed to protect compressor components. This parameter is advantageous in that it avoids the use of costly controls such as liquid injection to reduce discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

The above-noted and other operating parameters are determined for the compositions A1-A5 identified in Table A above in accordance with the present invention, and these operating parameters is reported in Table 4 below:

TABLE 4

| Name | Discharge Pressure (%) | Discharge Temp. (° C.) | Suction Pressure (%) | Normal Boiling Temp. (° C.) |
|---|---|---|---|---|
| R404A | 100% | 91.9 | 100% | −46.2 |
| A1 | 92% | 90.8 | 84% | −44.9 |
| A2 | 97% | 88.4 | 92% | −46.1 |
| A3 | 94% | 91.1 | 87% | −45.3 |
| A4 | 91% | 92.4 | 83% | −44.8 |
| A5 | 97% | 89.9 | 91% | −45.9 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions A1-A5, which in general can be used in most retrofit procedures without any change of major components. In all compositions A1-A5, the discharge pressure and temperature is below the limit and the Normal Boiling Temperature is similar to R404A therefore they can be used in most existent refrigeration systems.

In certain preferred embodiments, the replacement step is a drop-in replacement in the sense that no substantial redesign or modification of the system is required and no major item of equipment needs to be replaced in order to accommodate the refrigerant of the present invention. That is the case with the compositions A1-A5, which in general can be used in most retrofit procedures without any change of major components. In all compositions A1-A5, the discharge pressure and temperature is below the limit and the Normal Boiling Temperature is similar to R404A therefore they can be used in most existent refrigeration systems.

Although the invention has been described with reference to preferred embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed, but that the invention will include all embodiments falling within the scope of the appended claims or any claims later added.

What is claimed is:

1. A heat transfer composition comprising: (a) from about 10% to about 35% by weight of HFC-32; (b) from about 10% to about 35% by weight of HFC-125, wherein the weight ratio of said HFC-32:HF-125 is from about 0.9:1.2 to about 1.2:0.9; (c) from greater than 0% to about 30% by weight of HFO-1234yf and from greater than 0% to about 30% by weight of HFO-1234ze, wherein the ratio of HFO-1234ze:HFO-1234yf is about 7:20 and wherein said HFO-1234ze consists essentially of transHFO-1234ze; (d) from about 10% to about 35% by weight of HFC-134a, with the weight percent being based on the total of the components (a)-(d) in the composition.

2. The heat transfer composition of claim 1 comprising from greater than 15% to about 30% by weight of HFC-32.

3. The heat transfer composition of claim 1 comprising from greater than 20% to about 30% by weight of HFC-32.

4. The heat transfer composition of claim 1 comprising from greater than 10% to about 30% by weight of HFC-125.

5. The heat transfer composition of claim 1 comprising from greater than 20% to about 30% by weight of HFC-125.

6. The heat transfer composition of claim 1 comprising from greater than 0% to about 25% by weight of HFO-1234yf.

7. The heat transfer composition of claim 1 comprising from greater than 0% to about 22% by weight of HFO-1234yf.

8. The heat transfer composition of claim 1 comprising from about 1% to about 30% by weight of HFO-1234ze.

9. The heat transfer composition of claim 1 comprising from about 5% to about 30% by weight of HFO-1234ze.

10. The heat transfer composition of claim 1 comprising from greater than 0% to about 25% by weight of HFO-1234yf and from about 1% to about 30% by weight of HFO-1234ze.

11. The heat transfer composition of claim 1 comprising from greater than 0% to about 22% by weight of HFO-1234yf and from about 5% to about 30, % by weight of HFO-1234ze.

12. The heat transfer composition of claim 1 having a weight ratio of 134a to a combination of HFO-1234ze and HFO-1234yf between about 5:7 to about 1:1.

13. The heat transfer composition of claim 1 having a weight ratio of 134a to a combination of HFO-1234ze and HFO-1234yf of about 4:6.

14. The heat transfer composition of claim 1 wherein HFO-1234ze is provided in an amount of about 7% and HFO-1234yf is provided in an amount of about 20%.

15. The heat transfer composition of claim 1 comprising from greater than 15% to about 35% by weight of HFC-134a.

16. The heat transfer composition of claim 1 comprising from greater than 15% to about 30% by weight of HFC-134a.

17. The heat transfer composition of claim 1 further comprising up to about 5% by weight of CF3I.

18. The heat transfer composition of claim 1 further comprising up to about 5% by weight of HFCO-1233ze.

19. A method of replacing an existing heat transfer fluid contained in heat transfer system comprising removing at least a portion of said existing heat transfer fluid from said system, said existing heat transfer fluid being HFC-404A and replacing at least a portion of said existing heat transfer fluid by introducing into said system a heat transfer composition comprising: (a) from about 10% to about 35% by weight of HFC-32; (b) from about 10% to about 35% by weight of HFC-125, wherein the weight ratio of said HFC-32:HF-125 is from about 0.9:1.2 to about 1.2:0.9; (c) from about 0% to about 30% by weight of HFO-1234yf and from greater than 0% to about 30% by weight of HFO-1234ze wherein the ratio of HFO-1234ze:HFO-1234yf about 7:20 and wherein said HFO-1234ze consists essentially of transHFO-1234ze; (d) from about 10% to about 35% by weight of HFC-134a, with the weight percent being based on the total of the components (a)-(d) in the composition.

20. A heat transfer system comprising a compressor, a condenser and an evaporator in fluid communication, and a heat transfer composition according to claim 1 contained in said system, said condenser having an operating temperature of from about 35° C. to about 45° C.

21. The heat transfer system of claim 20 wherein said evaporator has an operating temperature of from about −40° C. up to less than about −15° C.

22. The heat transfer system of claim 20 wherein said evaporator has an operating temperature of from about −35° C. to about −25° C.

* * * * *